3,069,422
PYRIDINE QUATERNARY COMPOUNDS
John T. Fitzpatrick, Charleston, George W. Fowler, South Charleston, and Erich Marcus, Charleston, W. Va., assignors to Union Carbide Corporation, a corporation of New York
No Drawing. Filed Dec. 27, 1960, Ser. No. 78,244
4 Claims. (Cl. 260—240)

This invention relates to pyridine quaternary compounds as new compositions of matter, and to processes for their production.

The novel pyridine quaternary compounds of the instant invention can be graphically depicted by the formula

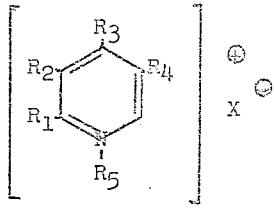

wherein X is a halogen radical selected from the group consisting of chlorine and bromine; $R_1$, $R_2$, $R_3$ and $R_4$ are members selected from the group consisting of hydrogen and alkyl radicals having from one to twelve carbon atoms, preferably from one to four carbon atoms; and $R_5$ is a radical having the structure

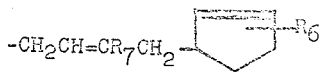

or

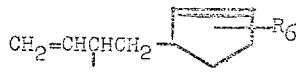

wherein $R_6$ is a member selected from the group consisting of hydrogen and alkyl radicals having from one to four carbon atoms, and $R_7$ is a member selected from the group consisting of hydrogen, chlorine, bromine, and alkyl radicals having from one to four carbon atoms. Illustrative of the novel pyridine quaternary compounds of the instant invention is 1-[4-(2-cyclopentenyl)-2-butenyl]-2-methyl-5-ethylpyridinium chloride which can be represented by the formula

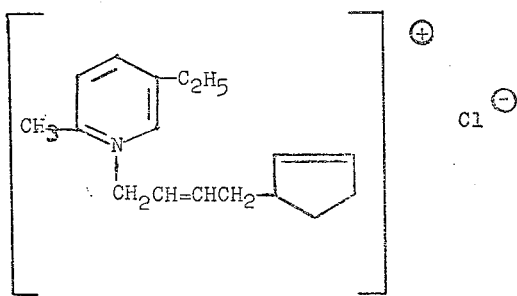

and such compounds as

1-[4-(3-methyl-2-cyclopentenyl)-2-butenyl]-2-methyl-5-ethylpyridinium chloride,
1-[4-(5-methyl-2-cyclopentenyl)-2-butenyl]-2-methyl-5-ethylpyridinium chloride,
1-[4-(4-ethyl-2-cyclopentenyl)-2-butenyl]-2-methyl-5-ethylpyridinium chloride,
1-[4-(4-n-butyl-2-cyclopentenyl)-2-butenyl]-2-methyl-5-ethylpyridinium chloride,
1-[4-(4-isobutyl-2-cyclopentyl)-2-butenyl]-2-methyl-5-ethylpyridinium chloride,
1-[3-chloro-4-(2-cyclopentenyl)-2-butenyl]-2-methyl-5-ethylpyridinium chloride,
1-[3-bromo-4-(2-cyclopentenyl)-2-butenyl]-2-methyl-5-ethylpyridinium chloride,
1-[3-methyl-4-(2-cyclopentyl)-2-butenyl]-2-methyl-5-ethylpyridinium chloride,
1-[3-isobutyl-4-(2-cyclopentenyl)-2-butenyl]-2-methyl-5-ethylpyridinium chloride,
1-[3-chloro-4-(3-methyl-2-cyclopentenyl)-2-butenyl]-2-methyl-5-ethylpyridinium chloride,
1-[3-methyl-4-(5-methyl-2-cyclopentenyl)-2-butenyl]-2-methyl-5-ethylpyridinium chloride,
1-[4-(2-cyclopentyl)-2-butenyl]pyridinium chloride,
1-[4-(3-methyl-2-cyclopentenyl)-2-butenyl]pyridinium chloride,
1-[4-(5-methyl-2-cyclopentenyl)2-butenyl]pyridinium chloride,
1-[4-(4-ethyl-2-cyclopentenyl)-2-butenyl]pyridinium chloride,
1-[4-(4-n-butyl-2-cyclopentenyl)-2-butenyl]pyridinium chloride,
1-[4-(4-isobutyl-2-cyclopentenyl)-2-butenyl]pyridinium chloride,
1-[3-chloro-4-(2-cyclopentenyl)-2-butenyl]pyridinium chloride,
1-[3-bromo-4-(2-cyclopentenyl)-2-butenyl]pyridinium chloride,
1-[3-methyl-4-(2-cyclopentenyl)-2-butenyl]pyridinium chloride,
1-[3-isobutyl-4-(2-cyclopentenyl)-2-butenyl]pyridinium chloride,
1-[3-chloro-4-(3-methyl-2-cyclopentenyl)-2-butenyl]-pyridinium chloride,
1-[3-methyl-4-(5-methyl-2-cyclopentenyl)-2-butenyl]-pyridinium chloride
1-[4-(2-cyclopentenyl)-2-butenyl]-2-methylpyridinium chloride,
1-[4-(3-methyl-2-cyclopentenyl)-2-butenyl]-2-methyl-pyridinium chloride,
1-[4-(5-methyl-2-cyclopentenyl)-2-butenyl]-2-methyl-pyridinium chloride,
1-[4-(4-ethyl-2-cyclopentenyl)-2-butenyl]-2-methyl-pyridinium chloride,
1-[4-(4-n-butyl-2-cyclopentenyl)-2-butenyl]-2-methyl-pyridinium chloride,
1-[4-(4-isobutyl-2-cyclopentenyl)-2-butenyl]-2-methyl-pyridinium chloride,
1-[3-chloro-4-(2-cyclopentenyl)-2-butenyl]-2-methyl-pyridinium chloride,
1-[3-bromo-4-(2-cyclopentenyl)-2-butenyl]-2-methyl-pyridinium chloride,
1-[3-methyl-4-(2-cyclopentenyl)-2-butenyl]-2-methyl-pyridinum chloride,
1-[3-isobutyl-4-(2-cyclopentenyl)-2-butenyl]-2-methyl-pyridinium chloride,
1-[3-chloro-4-(3-methyl-2-cyclopentenyl)-2-butenyl]-2-methylpyridinium chloride,
1-[3-methyl-4-(5-methyl-2-cyclopentenyl)-2-butenyl]-2-methylpyridinium chloride,
1-[4-(2-cyclopentenyl)-2-butenyl]-3-methylpyridinium chloride,
1-[4-(4-methyl-2-cyclopentenyl)-2-butenyl]-3-methyl-pyridinium chloride,
1-[4-(5-methyl-2-cyclopentenyl)-2-butenyl]-3-methyl-pyridinium chloride,
1-[4-(4-ethyl-2-cyclopentenyl)-2-butenyl]-3-methyl-pyridinium chloride,
1-[4-(4-n-butyl-2-cyclopentenyl)-2-butenyl]-3-methyl-pyridinium chloride,
1-[4-(4-isobutyl-2-cyclopentenyl)-2-butenyl]-3-methyl-pyridinium chloride, 1-[3-chloro-4-(2-cyclopentenyl)-2-butenyl]-3-methyl-
pyridinium chloride,
1-[3-bromo-4-(2-cyclopentenyl)-2-butenyl]-3-methyl-
pyridinium chloride,
1-[3-methyl-4-(2-cyclopentenyl)-2-butenyl]-3-methyl-
pyridinium chloride,
1-[3-isobutyl-4-(2-cyclopentenyl)-2-butenyl]-3-methyl-
pyridinium chloride,
1-[3-chloro-4-(3-methyl-2-cyclopentenyl)-2-butenyl]-3-
methylpyridinium chloride,
1-[3-methyl-4-(5-methyl-2-cyclopentenyl)-2-butenyl]-
3-methylpyridinium chloride,
1-[4-(2-cyclopentenyl)-2-butenyl]-4-methylpyridinium
chloride,
1-[4-(3-methyl-2-cyclopentenyl)-2-butenyl]-4-methyl-
pyridinium chloride,
1-[4-(5-methyl-2-cyclopentenyl)-2-butenyl]-4-methyl-
pyridinium chloride,
1-[4-(4-ethyl-2-cyclopentenyl)-2-butenyl]-4-methyl-
pyridinium chloride,
1-[4-(4-n-butyl-2-cyclopentenyl)-2-butenyl]-4-methyl-
pyridinium chloride,
1-[4-(4-isobutyl-2-cyclopentenyl)-2-butenyl]-4-methyl-
pyridinium chloride,
1-[3-chloro-4-(2-cyclopentenyl)-2-butenyl]-4-methyl-
pyridinium chloride,
1-[3-bromo-4-(2-cyclopentenyl)-2-butenyl]-4-methyl-
pyridinium chloride,
1-[3-methyl-4-(2-cyclopentenyl)-2-butenyl]-4-methyl-
pyridinium chloride,
1-[3-isobutyl-4-(2-cyclopentenyl)-2-butenyl]-4-methyl-
pyridinium chloride,
1-[3-chloro-4-(3-methyl-2-cyclopentenyl)-2-butenyl]-4-
methylpyridinium chloride,
1-[3-methyl-4-(5-methyl-2-cyclopentenyl)-2-butenyl]-4-
methylpyridinium chloride,
1-[4-(2-cyclopentenyl)-2-butenyl]-2,5-dimethyl-
pyridinium chloride,
1-[4-(3-methyl-2-cyclopentenyl)-2-butenyl]-2,5-dimethyl-
pyridinium chloride,
1-[4-(5-methyl-2-cyclopentenyl)-2-butenyl]-2,5-
dimethylpyridinium chloride,
1-[4-(4-ethyl-2-cyclopentenyl)-2-butenyl]-2,5-
dimethylpyridinium chloride,
1-[4-(4-n-butyl-2-cyclopentenyl)-2-butenyl]-2,5-
dimethylpyridinium chloride,
1-[4-(4-isobutyl-2-cyclopentenyl)-2-butenyl]-2,5-
dimethylpyridinium chloride,
1-[3-chloro-4-(2-cyclopentenyl)-2-butenyl]-2,5-
dimethylpyridinium chloride,
1-[3-bromo-4-(2-cyclopentenyl)-2-butenyl]-2,5-
dimethylpyridinium chloride,
1-[3-methyl-4-(2-cyclopentenyl)-2-butenyl]-2,5-
dimethylpyridinium chloride,
1-[3-isobutyl-4-(2-cyclopentenyl)-2-butenyl]-2,5-
dimethylpyridinium chloride,
1-[3-chloro-4-(3-methyl-2-cyclopentenyl)-2-butenyl]-2,5-
dimethylpyridinium chloride,
1-[3-methyl-4-(5-methyl-2-cyclopentenyl)-2-butenyl]-2,5-
dimethylpyridinium chloride,
1-[4-(2-cyclopentenyl)-2-butenyl]-3,5-dimethyl-
pyridinium chloride,
1-[4-(3-methyl-2-cyclopentenyl)-2-butenyl]-3,5-
dimethylpyridinium chloride,
1-[4-(5-methyl-2-cyclopentenyl)-2-butenyl]-3,5-
dimethylpyridinium chloride,
1-[4-(4-ethyl-2-cyclopentenyl)-2-butenyl]-3,5-
dimethylpyridinium chloride,
1-[4-(4-n-butyl-2-cyclopentenyl)-2-butenyl]-3,5-
dimethylpyridinium chloride,
1-[4-(4-isobutyl-2-cyclopentenyl)-2-butenyl]-3,5-
dimethylpyridinium chloride,
1-[3-chloro-4-(2-cyclopentenyl)-2-butenyl]-3,5-
dimethylpyridinium chloride,
1-[3-bromo-4-(2-cyclopentenyl)-2-butenyl]-3,5-
dimethylpyridinium chloride,
1-[3-methyl-4-(2-cyclopentenyl)-2-butenyl]-3,5-
dimethylpyridinium chloride,
1-[3-isobutyl-4-(2-cyclopentenyl)-2-butenyl]-3,5-
dimethylpyridinium chloride,
1-[3-chloro-4-(3-methyl-2-cyclopentenyl)-2-butenyl]-3,5-
dimethylpyridinium chloride,
1-[3-methyl-4-(5-methyl-2-cyclopentenyl)-2-butenyl]-3,5-
dimethylpyridinium chloride,
1-[4-(2-cyclopentenyl)-2-butenyl]-2,4-dimethyl-
pyridinium chloride,
1-[4-(4-methyl-2-cyclopentenyl)-2-butenyl]-2,4-
dimethylpyridinium chloride,
1-[4-(5-methyl-2-cyclopentenyl)-2-butenyl]-2,4-
dimethylpyridinium chloride,
1-[4-(4-ethyl-2-cyclopentenyl)-2-butenyl]-2,4-
dimethylpyridinium chloride,
1-[4-(4-n-butyl-2-cyclopentenyl)-2-butenyl]-2,4-
dimethylpyridinium chloride,
1-[4-(4-isobutyl-2-cyclopentenyl)-2-butenyl]-2,4-
dimethylpyridinium chloride,
1-[3-chloro-4-(2-cyclopentenyl)-2-butenyl]-2,4-
dimethylpyridinium chloride,
1-[3-bromo-4-(2-cyclopentenyl)-2-butenyl]-2,4-
dimethylpyridinium chloride,
1-[3-methyl-4-(2-cyclopentenyl)-2-butenyl]-2,4-
dimethylpyridinium chloride,
1-[3-isobutyl-4-(2-cyclopentenyl)-2-butenyl]-2,4-
dimethylpyridinium chloride,
1-[3-chloro-4-(3-methyl-2-cyclopentenyl)-2-butenyl]-2,4-
dimethylpyridinium chloride,
1-[3-methyl-4-(5-methyl-2-cyclopentenyl)-2-butenyl]-2,4-
dimethylpyridinium chloride,
1-[4-(2-cyclopentenyl)-2-butenyl]-4-n-proylpyridinium
chloride,
1-[4-(4-methyl-2-cyclopentenyl)-2-butenyl]-4-n-
propylpyridinium chloride,
1-[4-(5-methyl-2-cyclopentenyl)-2-butenyl]-4-n-
propylpyridinium chloride,
1-[4-(4-ethyl-2-cyclopentenyl)-2-butenyl]-4-n-
propylpyridinium chloride,
1-[4-(4-butyl-2-cyclopentenyl)-2-butenyl]-4-n-
propylpyridinium chloride,
1-[4-(4-isobutyl-2-cyclopentenyl)-2-butenyl]-4-n-
propylpyridinium chloride,
1-[3-chloro-4-(2-cyclopentenyl)-2-butenyl]-4-n-
propylpyridinium chloride,
1-[3-bromo-4-(2-cyclopentenyl)-2-butenyl]-4-n-
propylpyridinium chloride,
1-[3-methyl-4-(2-cyclopentenyl)-2-butenyl]-4-n-
propylpyridinium chloride,
1-[3-isobutyl-4-(2-cyclopentenyl)-2-butenyl]-4-n-
propylpyridinium chloride,
1-[3-chloro-4-(3-methyl-2-cyclopentenyl)-2-butenyl]-4-n-
propylpyridinium chloride,
1-[3-methyl-4-(5-methyl-2-cyclopentenyl)-2-butenyl]-4-
n-propylpyridinium chloride,
1-[4-(2-cyclopentenyl)-2-butenyl]-2-methyl-5-n-
butylpyridinium chloride,
1-[4-(4-methyl-2-cyclopentenyl)-2-butenyl]-2-methyl-5-n-
butylpyridinium chloride,
1-[4-(5-methyl-2-cyclopentenyl)-2-butenyl]-2-methyl-5-n-
butylpyridinium chloride,
1-[4-(4-ethyl-2-cyclopentenyl)-2-butenyl]-2-methyl-5-n-
butylpyridinium chloride,
1-[4-(4-n-butyl-2-cyclopentenyl)-2-butenyl]-2-methyl-
5-n-butylpyridinium chloride,
1-[4-(4-isobutyl-2-cyclopentenyl)-2-butenyl]-2-methyl-
5-n-butylpyridinium chloride,
1-[3-chloro-4-(2-cyclopentenyl)-2-butenyl]-2-methyl-
5-n-butylpyridinium chloride,
1-[3-bromo-4-(2-cyclopentenyl)-2-butenyl]-2-methyl-5-n-
butylpyridinium chloride, 1-[3-methyl-4-(2-cyclopentenyl)-2-butenyl]-2-methyl-5-n-butylpyridinium chloride,
1-[3-isobutyl-4-(2-cyclopentenyl)-2-butenyl[-2-methyl-5-n-butylpyridinium chloride,
1-[3-chloro-4-(3-methyl-2-cyclopentenyl)-2-butenyl]-2-methyl-5-n-butylpyridinium chloride,
1-[3-methyl-4-(5-methyl-2-cyclopentenyl)-2-butenyl]-2-methyl-5-n-butylpyridinium chloride,
1-[4-(3-methyl-2-cyclopentenyl)-2-butenyl]-4-isobutylpyridinium chloride,
1-[4-(5-methyl-2-cyclopentenyl)-2-butenyl]-3-n-hexylpyridinium chloride,
1-[4-(4-ethyl-2-cyclopentenyl)-2-butenyl]-3-ethylpyridinium chloride,
1-[4-(4-n-butyl-2-cyclopentenyl)-2-butenyl]-2,4,5-trimethylpyridinium chloride,
1-[4-(4-isobutyl-2-cyclopentenyl)-2-butenyl]-3-(2-ethylhexyl)-pyridinium chloride,
1-[3-chloro-4-(2-cyclopentenyl)-2-butenyl]-4-dodecylpyridinium chloride, and the corresponding bromide quaternary compounds.

The novel pyridine quaternary compounds of the instant invention can be produced by the reaction of a suitable pyridine compound with a suitable halo-substituted butenylcyclopentene.

The pyridine compounds which can be employed as starting materials in preparing the novel pyridine quaternary compounds of the instant invention can be graphically depicted by the formula

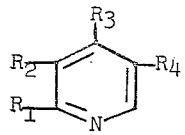

wherein $R_1$, $R_2$, $R_3$ and $R_4$ are as above defined. Illustrative of such starting materials is 2-methyl-5-ethylpyridine which can be represented by the formula

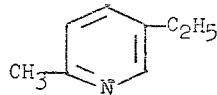

and such materials as pyridine, 2-methylpyridine, 3-methylpyridine, 4-methylpyridine, 2,5-dimethylpyridine, 3,5-dimethylpyridine, 2,4-dimethylpyridine, 4-n-propylpyridine, 2-methyl-5-n-butylpyridine, 3-ethylpyridine, 2,4,5-trimethylpyridine, 4-isopropylpyridine, 4-isobutylpyridine, 3-n-hexylpyridine, 3-(2-ethylhexyl)-pyridine, 4-dodecylpyridine, and the like.

The halo-substituted butenylcyclopentenes which can be employed as starting materials in preparing the novel pyridine quaternary compounds of the instant invention can be either a (4-halo-2-butenyl)cyclopentene or a (2-halo-3-butenyl)cyclopentene and can be graphically depicted by the formulae

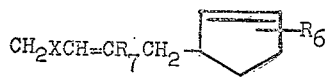

or

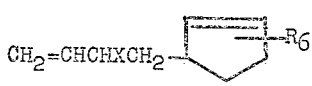

wherein X, $R_6$ and $R_7$ are as above defined. Illustrative of such starting materials is 3-(4-chloro-2-butenyl)cyclopentene which can be represented by the formula

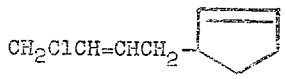

and 3-(2-chloro-2-butenyl)cyclopentene which can be represented by the formula

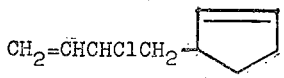

and such materials as 3-(4-chloro-2-butenyl)-4-methylcyclopentene, 3-(2-chloro-3-butenyl)-4-methylcyclopentene, 3-(4-chloro-2-butenyl)-1-methylcyclopentene, 3-(2-chloro-3-butenyl)-1-methylcyclopentene, 3-(4-chloro-2-butenyl)-5-ethylcyclopentene, 3-(2-chloro-3-butenyl)-5-ethylcyclopentene, 3-(4-bromo-2-butenyl)-4-n-butylcyclopentene, 3-(2-bromo-3-butenyl)-4-n-butylcyclopentene, 3-(4-chloro-2-butenyl)-4-isobutylcyclopentene, 3-(2-chloro-3-butenyl)-3-isobutylcyclopentene, 3-(4-chloro-2-methyl-2-butenyl)cyclopentene, 3-(2,4-dichloro-2-butenyl)cyclopentene, 3-(4-chloro-2-isobutyl-2-butenyl)cyclopentene, 3-(2,4 - dichloro - 2 - butenyl) - 1 - methylcyclopentene, 3 - (4 - chloro - 2 - methyl - 2 - butenyl) - 4 - methylcyclopentene, and the like.

When a (2-halo-3-butenyl)cyclopentene is employed as a starting material in preparing the novel pyridine quaternary compounds of the instant invention, it is believed that rearrangement occurs with the double bond shifting from the 3-position to the 2-position. Thus the product of the reaction may be the same as the product produced when a (4-halo-2-butenyl)cyclopentene is employed as a starting material. However, it has not been established that rearrangement occurs in all instances.

The pyridine compounds which can be employed as starting materials in preparing the novel pyridine quaternary compounds of the instant invention are known materials and can be prepared in accordance with procedures customarily employed in preparing such compounds.

The halo-substituted butenylcyclopentenes which can be employed as starting materials in preparing the novel pyridine quaternary compounds of the instant invention can be prepared by the reaction of a 1,3-butadiene with a suitable 3-halocyclopentene compound in the presence of a Friedel-Crafts catalyst, in the manner disclosed in copending application Serial No. 34,392, filed June 7, 1960, now Patent No. 3,035,102, which disclosure is incorporated herein by reference.

When effecting reaction according to the process of the instant invention, it is preferable to employ equimolar proportions of reactants. However, greater or lesser amounts of either reactant, for example amounts of pyridine compound ranging from as little as 0.1 mole to as much as 10 moles, per mole of halo-substituted butenylcyclopentene present, can also be employed.

Reaction according to the process of the instant invention readily occurs at temperatures ranging from as low as 60° C. to as high as 200° C., but is preferably effected at temperatures ranging from about 80° C. to about 130° C.

Atmospheric pressure is usually employed in effecting reaction according to the process of the instant invention. However, pressures both above and below atmospheric pressure, for example pressures ranging from as low as 1 mm. Hg to as high as 100 atmospheres, can also be employed whenever it is desirable to do so.

The novel pyridine quaternary compounds of the instant invention are useful as antistatic agents, wetting agents, and insect repellents.

The following examples are set forth for purposes of illustration so that those skilled in the art may better understand this invention, and it should be understood that they are not to be construed as limiting this invention in any manner.

EXAMPLE I

*Preparation of 1-[4-(2-Cyclopentenyl)-2-Butenyl]-2-Methyl-5-Ethylpyridinium Chloride*

An admixture of 31.3 grams of 3-(4-chloro-2-butenyl)-cyclopentene (0.2 mole) and 24.2 grams of 2-methyl-5-ethylpyridine (0.2 mole) was prepared and heated with stirring at a temperature of from 120° C. to 127° C. for two hours. At the end of this time, the reaction mixture was cooled to a temperature of 90° C., washed twice with petroleum ether, and dried under vacuum. The dried material was dissolved in 50 milliliters of water and neutralized with 71 milliliters of an aqueous solution of 0.5 N sodium hydroxide (indicating the presence of about 5.6 grams of 2-methyl-5-ethyl-pyridine hydrochloride). Fifteen grams of charcoal were then added and the mixture was steam-distilled to remove low-boiling impurities, filtered to remove the charcoal present, and evaporated to dryness under vacuum. The residue was added to 200 milliliters of acetone, and the resulting mixture was filtered (to remove sodium chloride) and evaporated to dryness. The residue was a yellow oil which weighed about 31 grams, and consisted of 1-[4-(2-cyclopentenyl)-2-butenyl]-2-methyl-5-ethylpyridinium chloride. This represented a yield of 1-[4-(2-cyclopentyl)-2-butenyl]-2-methyl-5-ethylpyridinium chloride of 57 percent of theoretical. The 1-[4-(2-cyclopentyl)-2-butenyl]-2-methyl-5-ethylpyridinium chloride was identified by chemical analysis. *Analysis.*—Calculated for $C_{17}H_{24}NCl$: Cl, 12.76%; N, 5.04%. Found: Cl, 12.41%; N, 4.62%.

EXAMPLE II

*Preparation of 1-[3-Chloro-4-(2-Cyclopentyl)-2-Butenyl]-2-Methyl-5-Ethylpyridinium Chloride*

An admixture of 38.2 grams of 3-(2,4-dichloro-2-butenyl)-cyclopentene (0.2 mole) and 24.2 grams of 2-methyl-5-ethylpyridine (0.2 mole) was prepared and heated with stirring at a temperature of from 98° to 114° C. for two hours and fifteen minutes. Upon cooling to room temperature, the reaction mixture solidified. The solidified material consisted of 1-[3-chloro-4-(2-cyclopentenyl)-2-butenyl]-2-methyl-5-ethylpyridinium chloride with about 3.9 percent by weight of 2-methyl-5-ethylpyridine hydrochloride present as an impurity (as determined by titration with sodium hydroxide using phenolphthalein as an indicator). Recrystallization of this material from 300 milliliters of acetone yielded 32 grams of 1 - [3 - chloro-4-(2-cyclopentenyl)-2-butenyl]-2-methyl-5-ethylpyridinium chloride. This represented a yield of 51 percent of theoretical. The 1-[3-chloro-4-(2-cyclopentenyl) - 2 - butenyl]-2-methyl-5-ethylpyridinium chloride was identified by chemical analysis. *Analysis.*—Calculated for $C_{17}H_{23}NCl_2$: N, 4.49%; Cl, 22.78%. Found: 4.73%; Cl, 23.28%.

EXAMPLE III

*Use of 1 - [3 - Chloro-4-(2-Cyclopentenyl)-2-Butenyl]-2-Methyl-5-Ethylpyridinium Chloride as an Insect Repellent*

The stem of an excised Tendergreen plant having paired seed leaves was placed in a test emulsion having a concentration of 250 p.p.m. of 1-[3-chloro-4-(2-cyclopentenyl) - 2 - butenyl]-2-methyl-5-ethylpyridinium chloride. The emulsion employed was prepared by dissolving 1000 mg. of 1 - [3 - chloro-4-(2-cyclopentenyl)-2-butenyl]-2-methyl-5-ethylpyridinium chloride in 50.0 ml. of acetone-emulsifier solution [prepared by admixing 1000 ml. of acetone and 2.0 ml. of "Triton X–155" (an alkyl aryl polyether alcohol, manufactured by Rohm and Haas Co., Washington Square, Philadelphia, Pa.)] and diluting the resulting mixture with water. The stem of a second similar Tendergreen plant was placed in a similar emulsion free from 1-[3-chloro-4-(2-cyclopentenyl)-2-butenyl]-2-methyl-5-ethylpyridinium chloride which was employed as a control.

After 48 hours had elapsed, the paired leaves were separated and removed from each of the plants, and placed in 9 in. Petri dishes. The Petri dishes were each lined with filter paper that had been moistened with 1 ml. of water. To each of these dishes were added four fourth instar larvae of the Mexican bean beetle (*Epilachna varvivestis*, Muls.) which had been reared on Tendergreen beans at a temperature of 80±5% and a relative humidity of 50±5%. The Petri dishes were then covered and maintained at a temperature of 80±5° F. for three days. At the end of this time, the dishes were examined. It was found that less than 10 percent of the leaves that had been treated with 1-[3-chloro-4-(2-cyclopentenyl)-2-butenyl]-2-methyl-5-ethylpyridinium chloride had been consumed by the larvae, while the leaves of the untreated control plant had been completely consumed.

What is claimed is:
1. A compound of the formula:

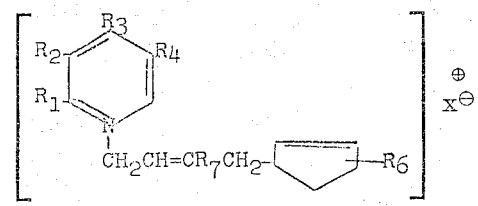

wherein $R_1$, $R_2$, $R_3$, $R_4$ and $R_6$ are members selected from the group consisting of hydrogen and alkyl of from one to four carbon atoms; $R_7$ is a member selected from the group consisting of hydrogen, chlorine, bromine and alkyl of from one to four carbon atoms; and X is selected from the group consisting of chlorine and bromine.

2. A compound of the formula:

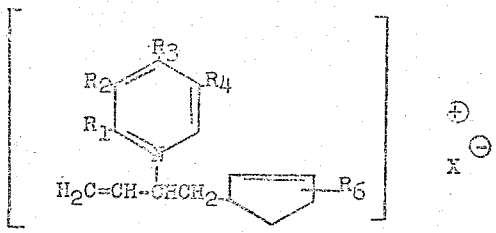

wherein $R_1$, $R_2$, $R_3$, $R_4$ and $R_6$ are members selected from the group consisting of hydrogen and alkyl of from one to four carbon atoms; and X is selected from the group consisting of chlorine and bromine.

3. 1 - [4 - (2-cyclopentenyl)-2-butenyl]-2-methyl-5-ethylpyridinium chloride.

4. 1 - [3 - chloro - 4 - (2 - cyclopentenyl)-2-butenyl]-2-methyl-5-ethylpyridinium chloride.

References Cited in the file of this patent

Chaco et al.: "Current Science," India, volume 22, No. 8, pages 240–1, August 1953.

UNITED STATES PATENT OFFICE
CERTIFICATE OF CORRECTION

Patent No. 3,069,422 December 18, 1962

John T. Fitzpatrick et al.

It is hereby certified that error appears in the above numbered patent requiring correction and that the said Letters Patent should read as corrected below.

Column 1, line 71, column 2, lines 5 and 13, and column 7, lines 16 and 18, for "-cyclopentyl", each occurrence, read -- -cyclopentenyl --; column 4, line 35, for "-proylpyridinium" read -- -propylpyridinium --; line 43, for "1-[4-(4-butyl-" read -- 1-[4-n-butyl- --; column 7, line 23, for "-Cyclopentyl)-", in italics, read -- -Cyclopentenyl)- --, in italics; column 8, line 11, for "varvivestis", in italics, read -- varivestis --, in italics.

Signed and sealed this 4th day of February 1964.

(SEAL)
Attest:

ERNEST W. SWIDER

Attesting Officer

EDWIN L. REYNOLDS

Acting Commissioner of Patents